United States Patent
Piet et al.

(10) Patent No.: US 7,606,892 B2
(45) Date of Patent: Oct. 20, 2009

(54) METHOD AND SYSTEM OF SUPPORTING A COMPUTER NETWORK RESOURCE POOL

(75) Inventors: Peter M. Piet, Orinda, CA (US); Rudolph J. Gomez, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 843 days.

(21) Appl. No.: 10/421,249

(22) Filed: Apr. 22, 2003

(65) Prior Publication Data

US 2004/0215777 A1 Oct. 28, 2004

(51) Int. Cl.
*G06F 15/173* (2006.01)
*G06F 11/30* (2006.01)
*G21C 17/00* (2006.01)
*G06F 11/00* (2006.01)

(52) U.S. Cl. .............. 709/224; 709/223; 702/184; 702/181; 714/1; 714/47

(58) Field of Classification Search .......... 709/226, 709/223–224; 370/252; 702/184, 181; 714/1–4, 714/47
See application file for complete search history.

(56) References Cited

U.S. PATENT DOCUMENTS

| 6,182,249 | B1 * | 1/2001 | Wookey et al. ............ 714/47 |
| 6,237,114 | B1 * | 5/2001 | Wookey et al. ............ 714/47 |
| 6,333,936 | B1 * | 12/2001 | Johansson et al. ......... 370/449 |
| 6,842,428 | B2 * | 1/2005 | Chen et al. ............... 370/252 |
| 6,847,918 | B2 * | 1/2005 | Loecher ................... 702/184 |
| 6,892,317 | B1 * | 5/2005 | Sampath et al. ............. 714/4 |
| 7,124,059 | B2 * | 10/2006 | Wetzer et al. ............. 702/184 |
| 2002/0120744 | A1 * | 8/2002 | Chellis et al. ............ 709/226 |

* cited by examiner

*Primary Examiner*—Ario Etienne
*Assistant Examiner*—Philip J Chea

(57) ABSTRACT

A method and system of supporting a computer network resource pool. In one embodiment of the invention, a resource pool sparing-plan and a resource pool support-plan are selected; for the selected resource sparing-plan and resource support-plan, the probability that all resources in the resource pool are operating properly is determined. The method is repeated to generate results from which an acceptable support-plan and a sparing-plan is chosen for implementation.

23 Claims, 3 Drawing Sheets a spare pool. A production pool is the pool of resources operating in the network. A spare pool is the pool of resources that are on stand-by for swapping into the production pool upon failure of a production pool resource, or for increasing or decreasing the production pool resources. The spare pool may also include unhealthy resources taken from the production pool and are awaiting repairs, and healthy resources that are available to be configured into the production pool.

METHOD AND SYSTEM OF SUPPORTING A COMPUTER NETWORK RESOURCE POOL

TECHNICAL FIELD

The present invention relates to resource pool planning in a computer network, in particular a method and system of supporting a resource pool in a computer network.

BACKGROUND ART

Computer networks are typically deployed with large resource pools in order to provide services to end-users. A resource pool is a pool of identical information technology (IT) hardware and other resources ("resources") comprising, for example, application servers, database servers, load balancers and processors communicatively coupled to the network.

A resource pool can be divided into a production pool and a spare pool. A production pool is the pool of resources operating in the network. A spare pool is the pool of resources that are on stand-by for swapping into the production pool upon failure of a production pool resource, or for increasing or decreasing the production pool resources. The spare pool may also include unhealthy resources taken from the production pool and are awaiting repairs, and healthy resources that are available to be configured into the production pool.

In addition to the resource pools, computer networks are also provided with a resource pool sparing-plan and a support-plan as a part of the overall strategy to support end-users. A sparing-plan is a plan that specifies the number of spare resources in the spare pool. A support-plan is a contract with a support provider that sets forth the type of support and frequency of support to be provided for resources in the production pool and spare pool. For example, a "2 spares/six hour call-to-repair" support-plan is a plan for a spare pool of 2 devices, and for any needed repair and recovery of a resource pool device to be completed within six hours of receiving a call for repair.

In implementing a strategy to support end-users, an important requirement is that end-users are provided with a choice of sparing and support-plans from which they may select the combination plan that best suits their needs. It is also an end-user requirement that the plans selected will execute with a predictable level of probability that all the resources in the production pool are operating properly, that the support will be timely, and that the cost of the plan is acceptable. Thus with the proper choice of sparing and support-plans, end-users can anticipate with a reliable probability that all the resources in the production pool will be operating properly, at an acceptable cost.

In the prior art, support organizations responsible for developing the support plan typically relied on a combination of quantitative and subjective factors in making their decisions. Thus, for example in the prior art, the support organization relied on "gut feel" and "educated guesses" and on quantitative factors such as resource failure rates, resource recovery rates and expected end-user demand, to establish the spare pool size and support plans.

While the prior art approach was successful to some extent in providing support plans, a problem with this approach was that since the plans were based on subjective factors, the plans could not provide a reliable estimate of the probability that all resources in the production pool are operating properly.

Another problem was that since the prior art plans were dependent on subjective factors, the prior art plans were not consistent in specifying an optimum sparing and support plan for the same resources in the network.

A further problem was that since the prior art plans were not fully automated, it was difficult and tedious to generate a choice of alternative plans from which the end-user may chose.

With the increasing complexity of networks and the increasing cost of providing resource pools and support-plans, it is becoming apparent that there is a need for a better way to choose the right mix of sparing and support-plans such that the networks are operated with a predictable level of reliability, at an acceptable cost.

Further, with the availability of a Utility Data Center (UDC) as discussed herein, where rapid switching of resources between the spare pools and production pools is possible, there is a desire for the sparing and support planning process to analytically incorporate the switching or reprovisioning rate together with spare resources, failure rates, and recovery rates. For example, analytically consider the novel concept of developing a sparing and support plan based on the simultaneous relationship between a sparing-plan that allows for the rapid switching of resources between the spare pool and the production pool, and a support plan where repairs occur on unhealthy devices in the spare pool that have been reprovisioned out of the production resource pool.

Accordingly, in view of shortcomings of the prior art, it is an objective of the present invention to provide for a better way to develop sparing and support-plans such that the network will operate with a predictable degree of reliability that all the resources in the production pool are operating properly, at an acceptable cost. Also, in view of the desire to leverage the use of automated planning tools in managing networks, such as those available in a Utility Data Center, it is an objective to provide for an alternative approach that will utilize these tools.

These and other objectives of the present invention will no doubt become obvious to those of ordinary skill in the art on reading the following detailed description of preferred embodiments in conjunction with the various Figures.

DISCLOSURE OF THE INVENTION

A method and system of supporting a computer network resource pool. In one embodiment of the invention, a resource pool sparing-plan and a resource pool support-plan are selected; for the selected resource sparing-plan and resource support-plan, the probability that all resources in the resource pool are operating properly is determined. The selections are repeated for different quantitative variables to generate alternative results from which a support-plan and a sparing-plan is chosen for implementation.

BRIEF DESCRIPTION OF THE DRAWINGS

The following Figures which are incorporated herein and form a part of this specification illustrate embodiments of the invention. Together with the description, they serve to explain the principles of the invention.

Figure 1:
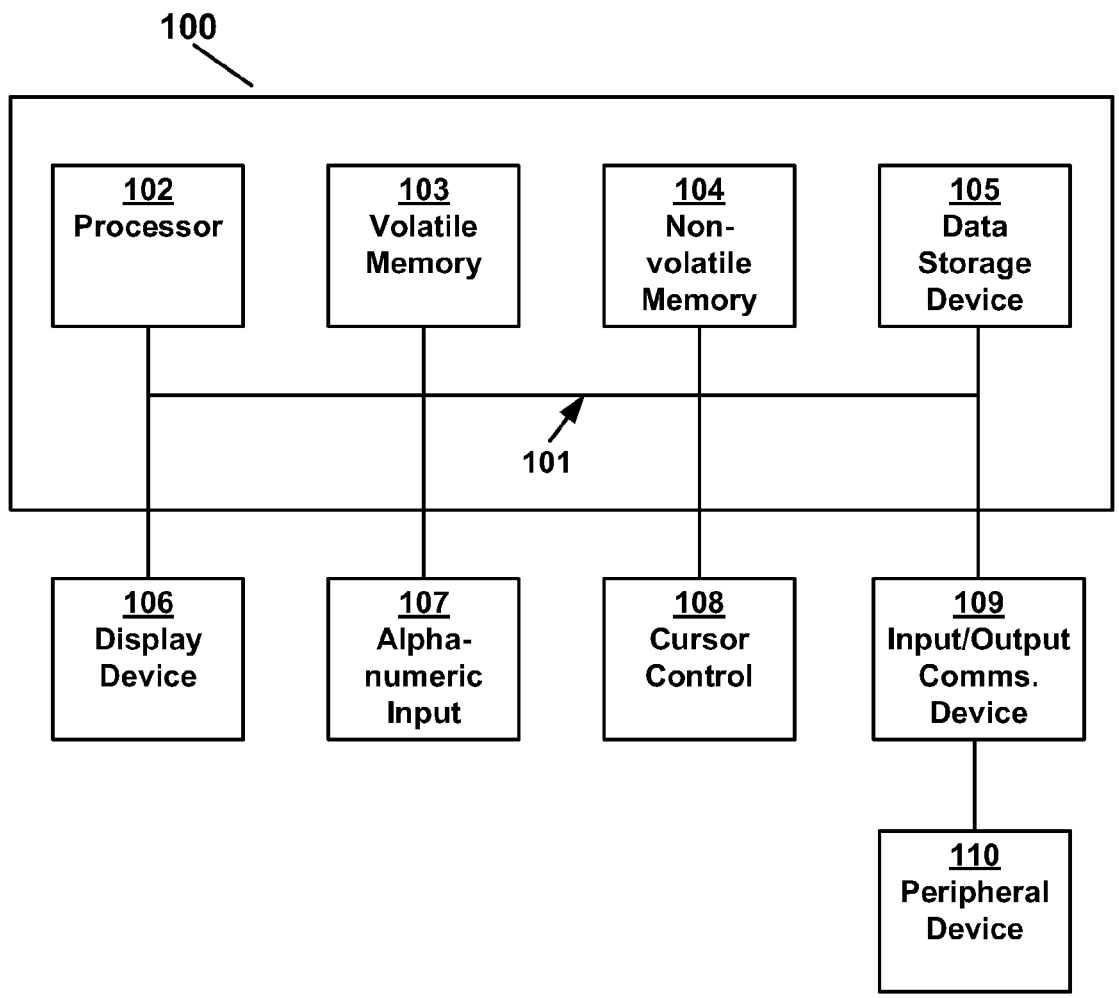
FIG. 1 is a block diagram of an exemplary computer system with which embodiments of the present invention may be utilized.

The drawings referred to in this description should not be understood as being drawn to scale except if specifically noted.

BEST MODE FOR CARRYING OUT THE INVENTION

In overview, embodiments of the present invention provide a method and system of supporting network resource pool such that end-users are provided with a choice of alternative sparing and support plans from which they may select the plan that best suits their needs. In one embodiment, a resource pool sparing-plan and a resource pool support-plan are selected; for the selected sparing and support plans, a probability that all resources in the resource pool are operating properly is determined. The method is repeated to generate several results from which an acceptable support-plan and a sparing-plan are chosen for implementation. Thus, with the present invention, qualitative factors in the planning process are eliminated (or at least minimized) and end-users are provided with the opportunity to select the plans with a desired level of probability that all resources in the resource pool are operating properly for a given pool of resources on the network.

Although embodiments of the present invention are well suited for use in determining a sparing and support plan in a computer network, embodiments of the invention are not limited to such uses but may also be used in other applications where, for a given combination of different of resources, it is desired to determine an optimum support plan with a desired probability that all resources are operating properly.

Reference will now be made in detail to embodiments of the present invention, examples of which are illustrated in the accompanying drawings. While the invention will be described in conjunction with preferred embodiments, it will be understood that they are not intended to limit the invention to these embodiments. On the contrary, the invention is intended to cover alternatives, modifications and equivalents which may be included within the spirit and scope of the invention as defined by the appended claims.

In the following description of the present invention, specific details are set forth in order to provide a thorough understanding of the present invention. However, it will be appreciated by one ordinarily skilled in the art that the present invention may be practiced without these specific details. In other instances, well known methods, procedures and mathematical approaches are not described in detail as not to unnecessarily obscure aspects of the present invention.

Some portions of the descriptions which follow are presented in terms of procedures, steps, logic blocks, processing, and other symbolic representations of operations on data bits that can be performed on computer memory. A procedure, computer executed step, logic block, process, etc., is here, and generally, conceived to be a self-consistent sequence of steps or instructions leading to a desired result. The steps are those requiring physical manipulations of physical quantities in a computer system. It should be noted that all of these and similar terms are to be associated with the appropriate physical quantities and are merely convenient labels applied to these quantities. Unless specifically stated otherwise as apparent from the following discussions, discussions utilizing terms such as "selecting," or "determining," "receiving," or "contacting," or "requesting," or "comparing," or "generating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display equipment.

With reference to FIG. 1, portions of the present invention are comprised of computer-readable and computer-executable instructions that reside, for example, in computer system 100 which may be a part of a general purpose computer network (not shown), or may be a stand-alone computer system. It will be appreciated that computer system 100 of FIG. 1 is exemplary only and that the present invention can operate within a number of different computer systems including general-purpose computer systems, embedded computer systems, laptop computer systems, hand-held computer systems, and stand-alone computer systems.

In the present embodiment, computer system 100 includes an address/data bus 101 for conveying digital information between the various components, a central processor unit (CPU) 102 for processing the digital information and instructions, a volatile main memory 103 comprised of volatile random access memory (RAM) for storing the digital information and instructions, and a non-volatile read only memory (ROM) 104 for storing information and instructions of a more permanent nature. In addition, computer system 100 may also include a data storage device 105 (e.g., a magnetic, optical, floppy, or tape drive or the like) for storing data. It should be noted that the software program for supporting a resource pool in accordance with an embodiment of the present invention can be stored either in volatile memory 103, data storage device 105, or in an external storage device (not shown).

Devices which are optionally coupled to computer system 100 include a display device 106 for displaying information to a computer user, an alpha-numeric input device 107 (e.g., a keyboard), and a cursor control device 108 (e.g., mouse, trackball, light pen, etc.) for inputting data, selections, updates, etc. Computer system 100 can also include a mechanism for emitting an audible signal (not shown). Optional display device 106 of FIG. 1 may be a liquid crystal device, cathode ray tube, or other display device suitable for creating graphic images and alpha-numeric characters recognizable to a user.

Computer system 100 can include an input/output (I/O) signal unit (e.g., interface) 109 for interfacing with a peripheral device 110 (e.g., a computer network, modem, mass storage device, etc.). Accordingly, computer system 100 may be coupled in a network, such as a client/server environment, whereby a number of clients (e.g., personal computers, workstations, portable computers, minicomputers, terminals, etc.) are used to run processes for performing desired tasks (e.g., "selecting," "including," "receiving," or "contacting," or "requesting," or "determining," or "comparing," or "generating,", etc.). In particular, computer system 100 can be coupled in a system for executing a software application program that embodies aspects the present invention.

Figure 2:
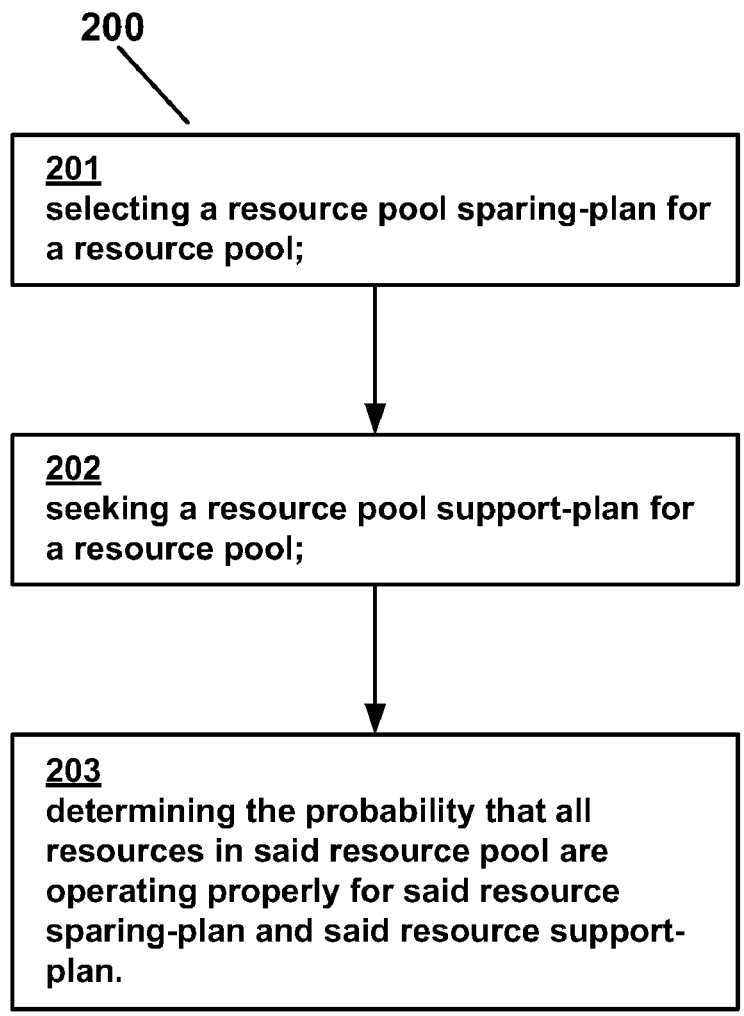
FIG. 2 is a flowchart of a method of a method of supporting a computer network resource pool in accordance with embodiments of the invention.

FIG. 2 is a flowchart 200 of a method of supporting a computer network resource pool in accordance with an embodiment of the present invention. For the purpose of illustrating the use of the present invention in conjunction with a Utility Data Center (UDC), the following discussion will utilize block diagram 300 of FIG. 3 and flowchart 200 of FIG. 2.

Figure 3:
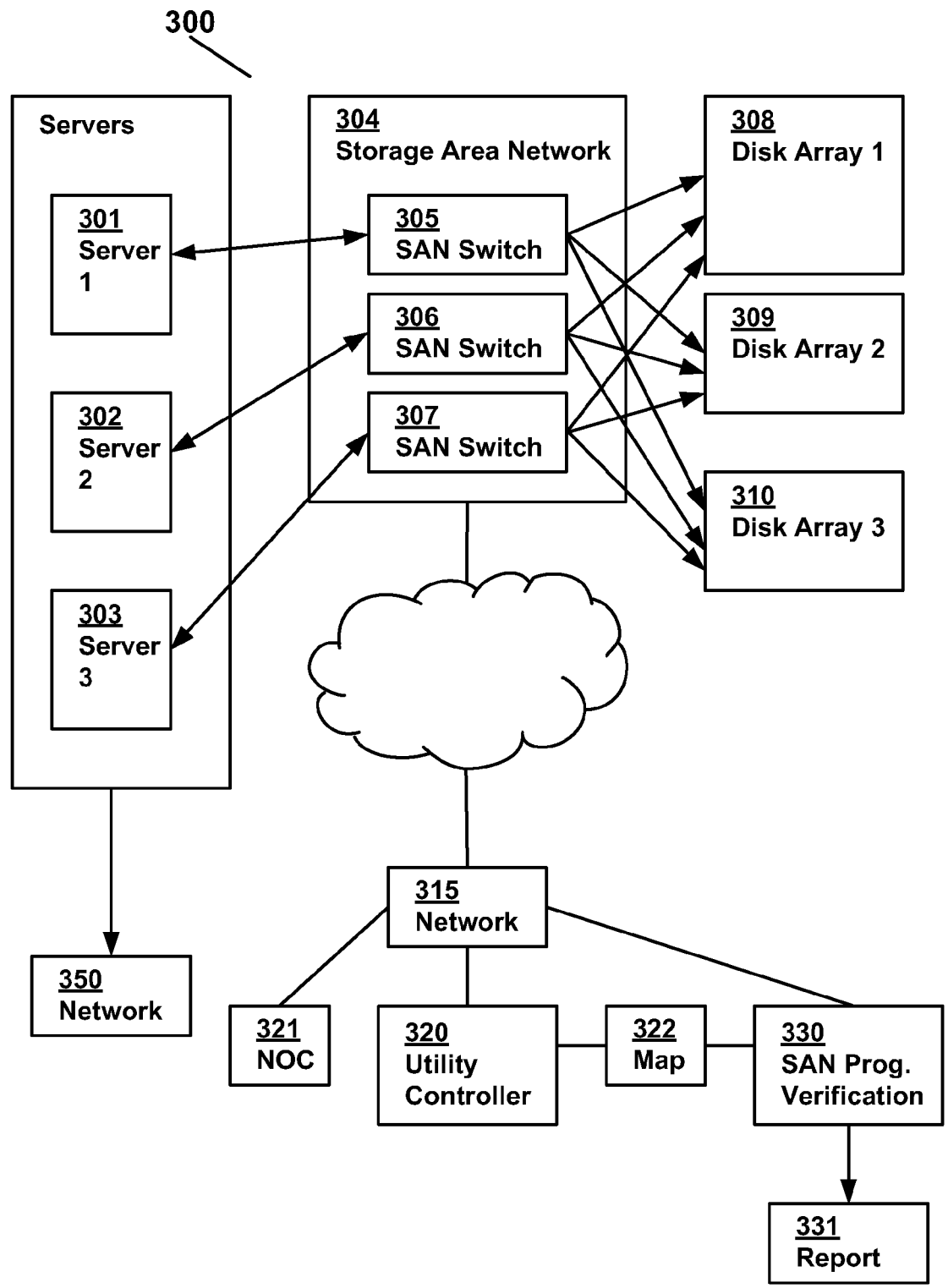
FIG. 3 is a block diagram of Utility Data Center configuration with which embodiments of the present invention may be utilized.

FIG. 3 is an exemplary block diagram of a utility data center (UDC) 300 for implementing embodiments of the present invention. In FIG. 3, a UDC is shown as comprising a plurality of servers (e.g., servers 301, 302, and 303) coupled with a plurality of disk arrays (e.g., disk arrays 308, 309, and 310) via storage area network (SAN) 304. More specifically, SAN 304 comprises a plurality of SAN switches (e.g., SAN switches 305, 306, and 307) that communicatively couple servers 301, 302, and 303 with disk arrays 308, 309, and 310. The disk arrays may include hundreds or even thousands of individual disk drives. Servers 301, 302, and 303 are further coupled with network 350 which is, for example, an enterprise backbone, or the Internet.

UDC 300 includes a network operations center (NOC) 321 and a utility controller 320 that are coupled with SAN 304 via a network 315. NOC 321 provides for overall control of UDC 300. In one embodiment, NOC 321 is manned by network technicians that monitor the management and allocation of resources in UDC 300. Network technicians may also provide for the installation and repair of physical resources in the pool of resources, or monitor the need for repair of physical resources after installation by the UDC supplier, and contact the appropriate support providers when appropriate. Also, NOC 321 acts as an interface between UDC 300 and a plurality of end users. NOC 321 can be coupled to the plurality of end users through the network 350.

Utility controller 320 manages the resources in the UDC 300. For example, utility controller 320 can enable the deployment, allocation, and management of resources in a network. One method for allocating resources in UDC 300 is the creation of "pools." Pools are logical assemblies of resources that are virtually coupled and managed by the utility controller software to implement solution designs. Utility controller 320, for example, monitors deployed pools and automatically re-deploys ("re-provisions") replacement resources from a spare resource pool to a production resource pool if a production pool failure is detected. The pools deployed with resources can be tailored to meet a wide variety of end-user needs. Each pool has its own dedicated computing, storage, and appliance resources. The pool can share common resources, such as storage and networking fabric, or can be managed as a plurality of networked pools within a larger enterprise network. In addition, the utility controller 320 monitors shared infrastructure resources, alerting NOC 321 of failures or other significant events, such as, intrusion attempts.

In one embodiment, UDC 300 can utilize a programmable infrastructure for enabling the virtual connection of any network resource as well as the isolation of a set of network resources. The pool of resources in UDC 300 comprises a pre-wired, pre-integrated and pre-tested plurality of physical resources from which multiple pools can be created on demand. The resources include, but are not limited to, servers, switches, computers, appliances (e.g., load balancers and firewalls), storage arrays, and backup devices. For example, SAN 304 may include a plurality of SCSI-to-fiber converters, fiber channel hubs, fiber channel switches and fiber channel bridges. The resources in UDC 300 are physically pre-wired, pre-tested, and integrated (ideally a one-time wiring solution) and then dynamically, and logically re-wired into various virtual pool environments. The resources can also be logically re-wired using virtual local area network technology (VLAN), in one embodiment. As such, UDC 300 can create and manage a plurality of virtual resource pools, each of which utilize a set of resources in UDC 300, or a plurality of networked pools within a larger enterprise network.

In one embodiment, UDC 300 can support multi-vendor and open systems for a wide variety of resources. As such, UDC 300 can provide support to resources that have the same functionality (e.g., firewalls) but are provided by different vendors. Also, UDC 300 can support the various operating systems that each of those resources may use.

Referring now to FIG. 2, although specific steps of an embodiment of the present invention are disclosed in flowchart 200, such steps are exemplary. That is, embodiments of the present invention can be performed by various other steps or steps equivalent to those steps recited in flowchart 200. Also, the steps in flowchart 200 may be performed in an order different than presented, and not all of the steps in flowchart 200 may be performed. All of, or a portion of, the method described by flowchart 200 may be implemented using computer-readable and computer-executable instructions which reside, for example, in computer-usable media of a computer system or like device. In one embodiment, the steps of flowchart 200 can be implemented by the exemplary computer system 100 of FIG. 1, utilizing the facilities available in UDC 300 of FIG. 3.

In step 203 of FIG. 2, the probability that all resources in the resource pool are operating properly for a particular resource sparing-plan and resource support-plan is determined by a mathematical model that utilizes a production pool availability model and a spare pool sufficiency model. This model takes into account several quantitative factors including: the amount of resources in the production pool and the spare pool, the resource (devices) failure rates and recovery rates, the reprovisioning time needed to swap in a healthy spare device for an unhealthy production pool device, as well as a wide variety of support plans (e.g. 24×7 six hour call to repair at one extreme to once per month scheduled visits at another extreme).

Since the availability and sufficiency models are state-space descriptions, the model can be solved using standard mathematical and statistical techniques such as continuous time Markov chain steady state solution mathematics of the prior art. In one embodiment, by varying the inputs of qualitative factors, the model can be used to generate a large number of possible sparing and support plans for comparison against a standard plan (e.g., the zero spare, 24×7, six hour call-to-repair offering). For ease of comparison, the results can be presented in tables of probabilities as shown, for example, in Table 1, below.

Development of the model requires several key considerations. Firstly, from the point of view of an end-user concerned with having an adequate sparing and support strategy for a resource pool, a key consideration is the probability that all production devices in the resource pool are operating properly. This probability represents the end-user's ability to create solutions based on having a full pool of available healthy production resources in the network.

Secondly, given a particular number of spare devices, it was determined that the "queuing theory" continuous time Markov chain approach (known in the prior art for use in performance modeling and prediction) could be adapted to determine an appropriate plan for resource support. In particular, for a specified number of spares, a state-space model that describes 4 queues is appropriate: a first queue that represents the number of healthy production pool devices; a second queue that represents the number of unhealthy production pool devices that have not yet been reprovisioned out of the production pool; a third queue that represents the number of healthy spare devices; and a fourth queue representing the number of unhealthy spare devices that are waiting to be repaired. For each scenario, a unique state space model is then developed corresponding to a particular number of spares (e.g. 0, 1, 2, . . . n spares). Input for the model is obtained from records of device failure rates, device repair and recovery rates, support plan offerings, and the UDC architecture experts familiar with the UDC controller reprovisioning rates.

Thirdly, the steady state availability solution is a lower asymptotic value for instantaneous availability (assuming the initial condition that all production resource devices and spare devices are healthy at time 0), and further the steady-state solution depends on the mean value of the time-to-failure, time-to-respond, time-to-repair and time-to-reprovision distributions, then only the mean value of the time-to-respond distribution needs to be developed for each support plans being considered, since the mean values for the other distributions are readily available from historical records. Assuming that failures can occur at any time with equal probability, the mean time-to-respond can be developed for each support plan using standard mixture distribution expectation mathematics applied to the appropriate underlying uniform distributions. The mean time-to-respond can also be developed assuming other scenarios regarding failures occurring with higher probability during heavier usage periods (using mixture distribution mathematics applied to non-uniform underlying distributions).

From the above method, the probability that all resources in the production pool are operating properly can be calculated for a specified production pool size, sparing-plan and support-plan, as is illustrated in Table 1. With this information, an end-user can decide which plan to adopt for deployment in the network.

Exemplary Table 1 shows a probability distribution that all production server hardware in a resource pool are operating, using the present invention. Table 1 is a matrix array wherein the rows correspond to the size units in the production pool (5, 10, 15, . . . , 100) and wherein the columns represent the available sparing and support-plans, e.g. 2 spare/24×7/6 hour call-to-repair scenario (best case) to a 0 spare/1 scheduled visit per month scenario (worst case). As an example, it can be seen that the 2 spares/one scheduled visit per week scenario is superior to the 0 spare/24×7/6 hour call-to-repair scenario (e.g. for 100 servers, 0.9975 vs. 0.9937).

TABLE 1

Example of Resource Pool Support and Sparing Plan-Probability That All Resources in the Resource Pool Are Operating Properly

| Size of Resource Pool | Sparing And Support Plan Options | | | |
|---|---|---|---|---|
| | 2 spare/ 24 × 7/6 hour call-to-repair | 2 Spares/ one scheduled visit/week | 0 Spare/ 24 × 7/6 hour call-to-repair | 0 spare/1 scheduled visit per month |
| 5 | .99995 | .99995 | .99952 | .97192 |
| 10 | .99991 | .99990 | .99905 | .98711 |
| 20 | .99981 | .99980 | .99981 | .97455 |
| 50 | .99953 | .99930 | .99952 | .93865 |
| 100 | .99907 | .99749 | .99369 | .88425 |

From the above matrix, a resource pool sparing-plan for the network can be selected in accordance with step 201 of FIG. 2, and a resource pool support-plan for said network can also be selected in accordance with step 202 of FIG. 1. Thus the present invention correlates the size of the production pool, the size of the spare pool, the support plan, the UDC ability to quickly switch resource between the spare pool and the production pool, the type and frequency of support and quantitative hardware performance factors to develop an optimum resource and support plans.

Embodiments of the present invention are thus described. While the present invention has been described in particular embodiments, it should be appreciated that the present invention should not be construed as limited by such embodiments, but rather construed according to the following claims.

What is claimed is:

1. A method of supporting a computer network resource pool, comprising:
a processor performing the steps of:
selecting a first and a second resource pool sparing-plans for said resource pool;
selecting a first and a second resource pool support-plans for said resource pool; and
determining a first probability that all resources in said resource pool are operating properly for said first resource sparing-plan and said first resource support-plan and a second probability that all resources in said resource pool are operating properly for said second resource sparing-plan and said second resource support-plan, wherein said first probability and said second probability enable implementation of a particular resource pool support-plan from said first resource pool support-plan and said second resource pool support-plan;
wherein said determining said first probability that all resources in said resource pool are operating properly for said first resource sparing-plan and said first resource support-plan, comprises applying a mathematical model for correlating resource availability in said resource pool, failure rates and recovery rates of said resources, reprovisioning time needed to swap a healthy spare resource for an unhealthy production pool resource, and a plurality of support-plans for said resources.

2. The method of claim 1, wherein said resource pool comprises a pool of production resources in said network.

3. The method of claim 1, wherein said sparing-plans comprise plans for the provisioning of spare resources in said network.

4. The method of claim 1, wherein said support-plans comprise plans for provisioning of support for said resource pool.

5. The method of claim 1, wherein said resource pool comprises application servers, database servers, data storage, disk drives, load balancers and processors communicatively coupled to said network.

6. The method of claim 1, wherein said mathematical model comprises applying a Markov chain steady-state solution analysis methodology.

7. The method of claim 1, wherein said selecting a first and a second resource pool sparing-plans, said selecting a first and a second resource pool support plan, said determining, and said implementation are performed automatically on a computer system.

8. The method of claim 1, wherein said computer network is communicatively coupled with a utility data center.

9. The method of claim 1, further comprising implementing said particular resource pool support-plan and a particular resource pool sparing-plan by selecting a probability that all resources in said resource pool are operating properly.

10. A computer data center comprising:
a bus for communicating information;
a processor coupled with said bus for processing said information; and a computer readable media coupled with said bus and comprising instructions for implementing a method of supporting a computer network resource pool, said method comprising:
selecting a first and a second resource pool sparing-plans for said resource pool;
selecting a first and a second resource pool support-plans for said resource pool; and
determining a first probability that all resources in said resource pool are operating properly for said first resource sparing-plan and said first resource support-plan and a second probability that all resources in said resource pool are operating properly for said second resource sparing-plan and said second resource support-plan, wherein said first probability and said second probability enable implementation of a particular resource pool support-plan from said first resource pool support-plan and said second resource pool support plan;

wherein said determining said first probability that all resources in said resource pool are operating properly for said first resource sparing-plan and said first resource support-plan, comprises applying a mathematical model for correlating resource availability in said resource pool, failure rates and recovery rates of said resources, reprovisioning time needed to swap in healthy spare resource for an unhealthy production pool resource, and a plurality of support-plans for said resources.

11. The computer data center of claim 10, wherein said resource pool comprises a pool of production resources in said network.

12. The computer data center of claim 10, wherein said sparing-plans comprise plans for the provisioning of spare resources in said network.

13. The computer data center of claim 10, wherein said support-plans comprise plans for provisioning of support for said resource pool.

14. The computer data center of claim 10, wherein said resource pool comprises application servers, database servers, data storage, disk drives, load balancers and processors communicatively coupled to said network.

15. The computer data center of claim 10, wherein said mathematical model comprises applying a Markov chain steady-state solution analysis methodology.

16. The computer data center of claim 10 wherein said selecting a first and a second resource pool sparing-plans, said selecting a first and a second resource pool support plan, said determining, and said implementation are performed automatically on a computer system.

17. A computer-useable medium having computer readable code stored thereon for causing a utility data center to perform a method of supporting a computer network resource pool, said method comprising:

selecting a first and a second resource pool sparing-plans for said resource pool;

selecting a first and a second resource pool support-plans for said resource pool; and determining a first probability that all resources in said resource pool are operating properly for said first resource sparing-plan and said first resource support-plan and a second probability that all resources in said resource pool are operating properly for said second resource sparing-plan and said second resource support-plan, wherein said first probability and said second probability enable implementation of a particular resource pool support-plan from said first resource pool support-plan and said second resource pool support-plan;

wherein said determining said first probability that all resources in said resource pool are operating properly for said first resource sparing-plan and said first resource support-plan, comprises applying a mathematical model for correlating resource availability in said resource pool, failure rates and recovery rates of said resources, reprovisioning time needed to swap in healthy spare resource for an unhealthy production pool resource, and a plurality of support-plans for said resources.

18. The computer-useable medium of claim 17, wherein said resource pool comprises a pool of production resources in said network.

19. The computer-useable medium of claim 17, wherein said sparing-plans comprise plans for the provisioning of spare resources in said network.

20. The computer-useable medium of claim 17, wherein said support-plans comprise plans for provisioning of support for said resource pool.

21. The computer-useable medium of claim 17, wherein said resource pool comprises application servers, database servers, data storage, disk drives, load balancers and processors communicatively coupled to said network.

22. The computer-useable medium of claim 17, where said mathematical model comprises applying a Markov chain steady-state solution analysis methodology.

23. The computer-useable medium of claim 17, wherein said computer network is communicatively coupled with a utility data center.

* * * * *

UNITED STATES PATENT AND TRADEMARK OFFICE
CERTIFICATE OF CORRECTION

PATENT NO. : 7,606,892 B2 Page 1 of 1
APPLICATION NO. : 10/421249
DATED : October 20, 2009
INVENTOR(S) : Peter M. Piet et al.

It is certified that error appears in the above-identified patent and that said Letters Patent is hereby corrected as shown below:

In column 9, line 8, in Claim 10, delete "support plan;" and insert -- support-plan; --, therefor.

In column 10, line 37, in Claim 22, delete "where" and insert -- wherein --, therefor.

Signed and Sealed this

Sixth Day of April, 2010

David J. Kappos
*Director of the United States Patent and Trademark Office*